(12) United States Patent
Gu et al.

(10) Patent No.: US 12,049,276 B2
(45) Date of Patent: Jul. 30, 2024

(54) BOTTLE ASSEMBLY, BOTTLE AND SUPPORTING DEVICE

(71) Applicant: TIEN HSIN INDUSTRIES CO., LTD., Taichung (TW)

(72) Inventors: Fong-Syuan Gu, Taichung (TW); Jing-Heng Jian, Taichung (TW)

(73) Assignee: TIEN HSIN INDUSTRIES CO., LTD., Taichung (TW)

( * ) Notice: Subject to any disclaimer, the term of this patent is extended or adjusted under 35 U.S.C. 154(b) by 227 days.

(21) Appl. No.: 17/462,007

(22) Filed: Aug. 31, 2021

(65) Prior Publication Data

US 2023/0066015 A1 Mar. 2, 2023

(51) Int. Cl.
| | | |
|---|---|---|
| B65D 25/24 | (2006.01) | |
| A45F 3/16 | (2006.01) | |
| B62J 11/04 | (2020.01) | |

(52) U.S. Cl.
CPC ............... *B62J 11/04* (2020.02); *A45F 3/16* (2013.01); *B65D 25/24* (2013.01)

(58) Field of Classification Search
CPC ......... B62J 9/20; B62J 9/22; B62J 9/24; B62J 11/04; B65D 25/22
See application file for complete search history.

(56) References Cited

U.S. PATENT DOCUMENTS

| | | | | |
|---|---|---|---|---|
| 9,526,317 | B2 * | 12/2016 | Willows | .................. A45F 5/021 |
| 2005/0156001 | A1 * | 7/2005 | Dal Pra | ..................... B62J 11/19 |
| | | | | 280/281.1 |
| 2010/0059565 | A1 * | 3/2010 | Cote | ........................... B62J 9/22 |
| | | | | 224/463 |
| 2010/0176259 | A1 * | 7/2010 | Pennino | .................... B62J 11/04 |
| | | | | 248/205.1 |
| 2013/0181015 | A1 * | 7/2013 | Cason | ....................... B62J 11/04 |
| | | | | 222/78 |

\* cited by examiner

*Primary Examiner* — Andrew T Kirsch

(57) ABSTRACT

A bottle assembly includes a bottle and a supporting device. The bottle has opposite top and bottom and a bottle wall extending from the top to the bottom. An outer surface of the bottle wall has first positioning portions. The bottle wall has first and second sides. The supporting device includes a base and a bottle holder connected to the base and accommodating the bottle. The bottle holder has corresponding second positioning portions. The bottle has first and second installation modes. When in the first installation mode, the second side faces the base, and the second positioning portions and some of first positioning portions are fixed to each other. When in the second installation mode, the first side faces the base, and the second positioning portions and some of the first positioning portions are fixed to each other. The bottle and the supporting device are also provided.

12 Claims, 12 Drawing Sheets

BOTTLE ASSEMBLY, BOTTLE AND SUPPORTING DEVICE

FIELD OF THE INVENTION

The present invention relates to a container assembly, and more particularly to a bottle assembly, a bottle and a supporting device adapted to accommodate the bottle.

BACKGROUND OF THE INVENTION

Bicycles are not only a means of transportation, but also provide sports and fitness functions. There are many bottle holders that can be installed on bicycle racks on the market to facilitate the rider to replenish water during the ride and to reduce the rider's carry-on weight.

However, most of the bottle holders can only provide a single installation way. Therefore, after obtaining a specific bottle holder, the rider often cannot change the installation way of the bottle holder according to the rider's body shape and riding habits. If the rider chooses a bottle holder that does not meet his/her own needs, he/she will not be able to easily pick up and return the bottle while riding. This will not only easily affect the competition results, but may even cause serious traffic accidents. On the other hand, because the same bottle holder can only meet the needs of specific riders, this also affects the sales of the bottle holder.

SUMMARY OF THE INVENTION

The present invention provides a bottle assembly, which has the advantages of various installation ways.

The present invention provides a bottle, which can be inserted and fixed in a supporting device in various ways.

The present invention provides a supporting device, which provides various ways for the bottle to be inserted and fixed.

The bottle assembly provided by the present invention includes a bottle and a supporting device. The bottle has a top, a bottom and a bottle wall. The top and the bottom are opposite to each other. The bottle wall extends from the top to the bottom. An outer surface of the bottle wall has a plurality of first positioning portions. The bottle wall has a first side and a second side opposite to each other. The supporting device includes a base and a bottle holder. The bottle holder is connected to the base and adapted to accommodate the bottle. The bottle holder has a plurality of second positioning portions corresponding to the plurality of first positioning portions. The bottle has a first installation mode and a second installation mode. When the bottle is in the first installation mode, the second side faces the base, and the plurality of second positioning portions and at least part of the plurality of first positioning portions are fixed to each other. When the bottle is in the second installation mode, the first side faces the base, and the plurality of second positioning portions and at least part of the plurality of first positioning portions are fixed to each other.

In an embodiment of the present invention, the bottle wall has a central axis passing through the top and the bottom. The plurality of first positioning portions includes two first grooves close to the top. The two first grooves are symmetrically arranged with respect to the central axis. One of the plurality of second positioning portions is a first buckle. When the bottle is in the first installation mode, the first buckle is buckled to one of the two first grooves. When the bottle is in the second installation mode, the first buckle is buckled to the other of the two first grooves.

In an embodiment of the present invention, the plurality of first positioning portions further includes two second grooves close to the bottom. The two second grooves are symmetrically arranged with respect to the central axis. The plurality of second positioning portions further includes two second buckles corresponding to the two second grooves.

In an embodiment of the present invention, the two first grooves are respectively located on the first side and the second side. The two second grooves are respectively located on opposite sides of the bottle wall between the first side and the second side.

In an embodiment of the present invention, the outer surface of the bottle wall is further provided with two positioning convex portions close to the top. The two positioning convex portions are symmetrically arranged with respect to a first reference plane passing through the first side, the second side and the central axis. An outline of the bottle holder is formed with two abutting portions. Shapes of the two abutting portions match shapes of the two positioning convex portions. The two positioning convex portions are adapted to abut against the two abutting portions.

In an embodiment of the present invention, the shapes of the two positioning convex portions are symmetrical with respect to a second reference plane perpendicular to the first reference plane.

In an embodiment of the present invention, the base has a supporting portion and two connecting portions. The two connecting portions are connected to opposite sides of the supporting portion so that the base has a convex side and a concave side opposite to each other. The supporting portion has two supporting surfaces respectively located on the convex side and the concave side, and the bottle holder is adapted to be connected to any one of the two supporting surfaces.

In an embodiment of the present invention, the supporting portion further has an elongated hole penetrating the two supporting surfaces. The bottle holder has a fixing portion adapted to be connected to the supporting portion, and the fixing portion has an opening corresponding to the elongated hole.

In an embodiment of the present invention, the bottle further includes a bottle body and a bottle cap. The top is located at the bottle cap. The bottom is located at the bottle body, and the plurality of first positioning portions is located on the bottle body.

In an embodiment of the present invention, the bottle further includes a bottle body and a bottle cap. The bottle cap is located at the top and has a part of the bottle wall. The bottle body is arranged between the top and the bottom and has another part of the bottle wall. The plurality of first positioning portions is located on the bottle body. The bottle cap is provided with a water delivery hole on the first side.

In an embodiment of the present invention, the bottle body has a bottle opening opposite to the bottom. An outer diameter of the bottle body gradually decreases from the bottle opening toward the bottom.

In an embodiment of the present invention, the supporting device further includes a stopwatch fixing portion. The stopwatch fixing portion is detachably connected to the bottle holder or the base.

The supporting device provided by the present invention is supporting device adapted to accommodate the aforementioned bottle. The supporting device includes a base and a bottle holder. The bottle holder is connected to the base and adapted to accommodate the bottle. The bottle holder has a plurality of second positioning portions corresponding to the plurality of first positioning portions. When the bottle is in the first installation mode, the base is adapted to be close to the second side and far away from the first side, and the plurality of second positioning portions is adapted to be fixed to at least part of the plurality of first positioning portions. When the bottle is in the second installation mode, the base is adapted to be close to the first side and far away from the second side, and the plurality of second positioning portions is adapted to be fixed to at least part of the plurality of first positioning portions.

The bottle provided by the present invention is adapted to be placed in the aforementioned supporting device. The bottle includes a top, a bottom and a bottle wall. The top and the bottom are opposite to each other. The bottle wall extends from the top to the bottom. An outer surface of the bottle wall has a plurality of first positioning portions, and the bottle wall has a first side and a second side opposite to each other. The bottle has a first installation mode and a second installation mode. When the bottle is in the first installation mode, the second side is adapted to face the base, and at least part of the plurality of first positioning portions is adapted to be fixed to the plurality of second positioning portions. When the bottle is in the second installation mode, the first side is adapted to face the base, and at least part of the plurality of first positioning portions is fixed to the plurality of second positioning portions.

In the bottle assembly of the present invention, the second side of the bottle faces the base and is fixed to the bottle holder when the bottle is in the first installation mode, and the first side of the bottle faces the base and is fixed to the bottle holder when the bottle is in the second installation mode. Based on the above, the bottle of the present invention can be fixed to the supporting device in at least two different postures, and therefore the bottle assembly of the present invention has the advantage of various installation ways. Similarly, the supporting device of the present invention can provide a variety of ways for the bottle to be inserted and fixed.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
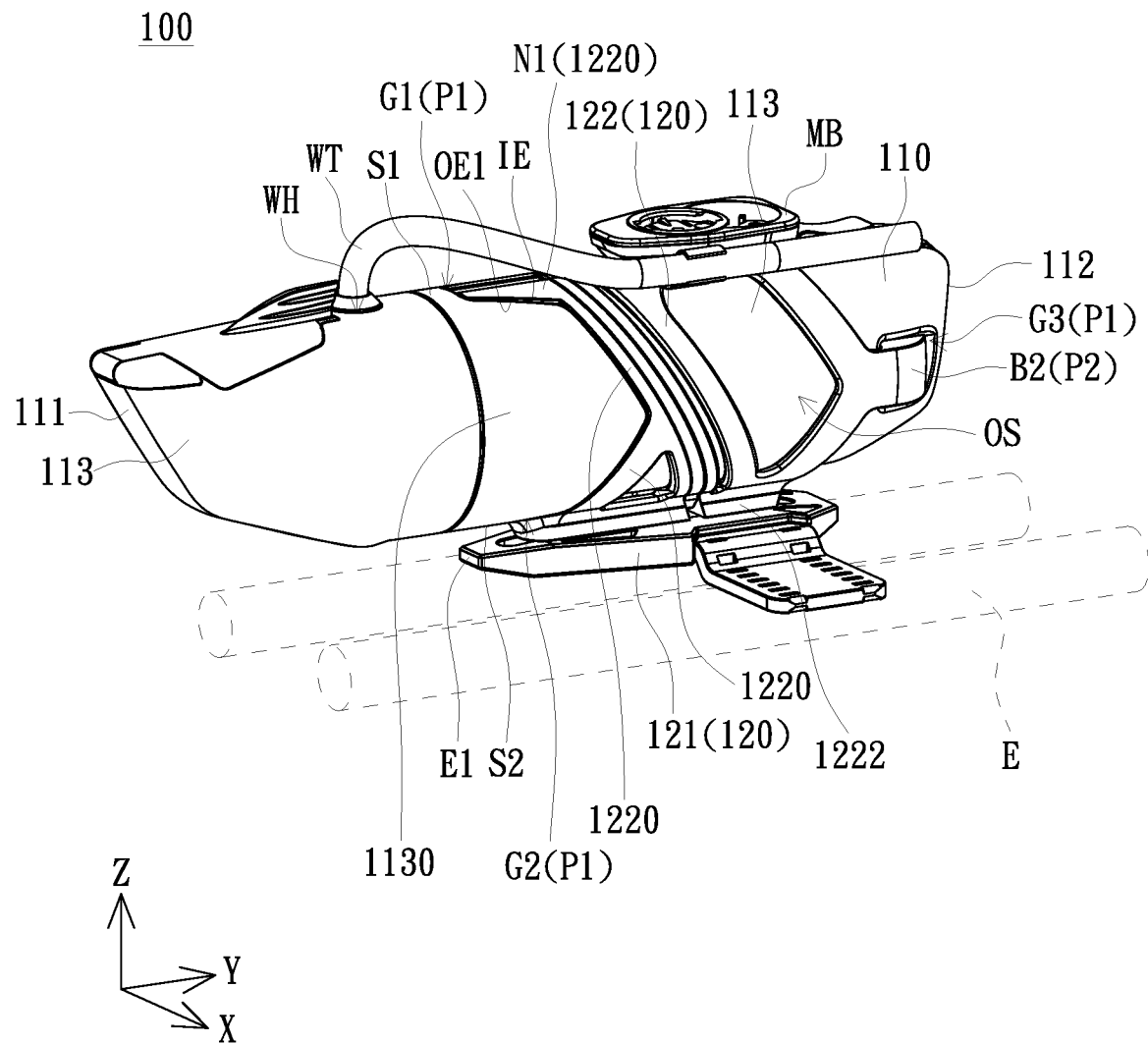
FIG. 1 is a schematic view of a bottle of a bottle assembly in a first installation mode according to an embodiment of the present invention.
Figure 2:
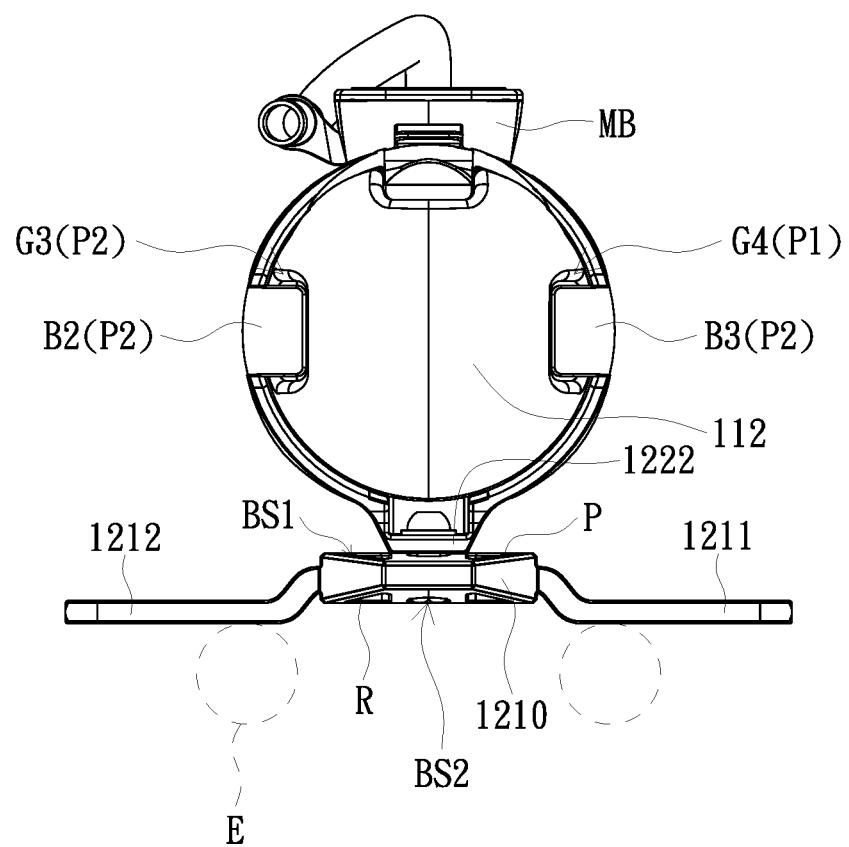
FIG. 2 is a schematic view of the bottle assembly of FIG. 1 viewed from another angle.
Figure 3:
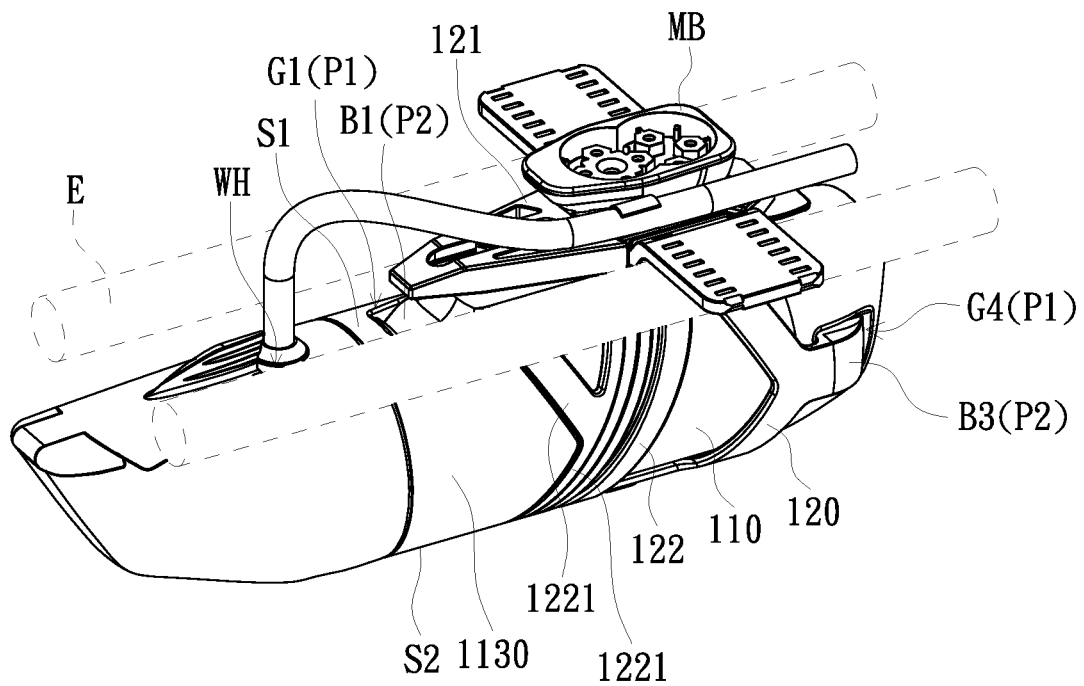
FIG. 3 is a schematic view of the bottle of the bottle assembly of FIG. 1 in a second installation mode.
Figure 4:
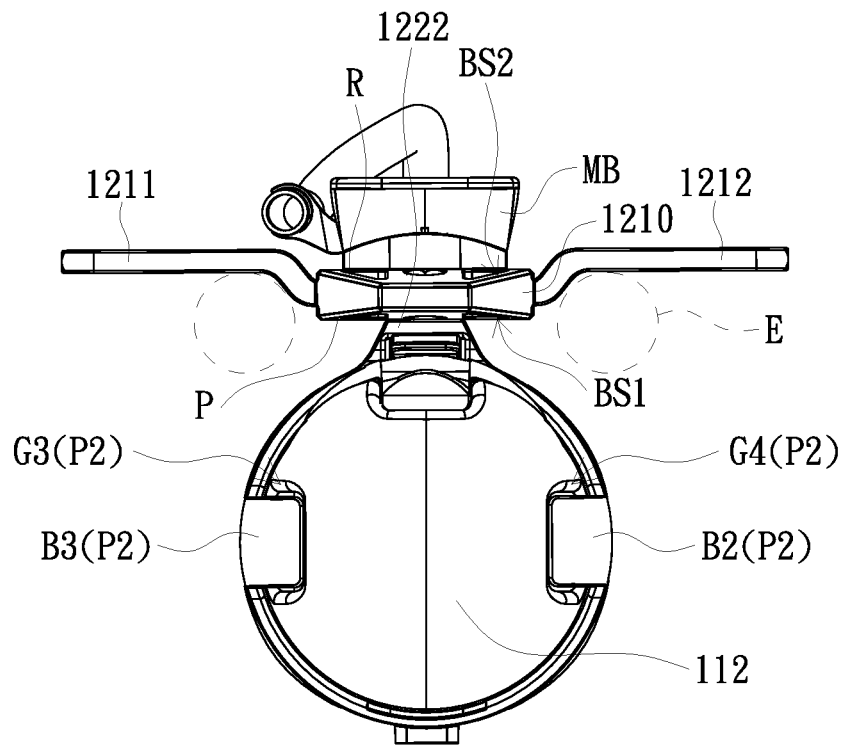
FIG. 4 is a schematic view of the bottle assembly of FIG. 3 viewed from another angle.
Figure 5:
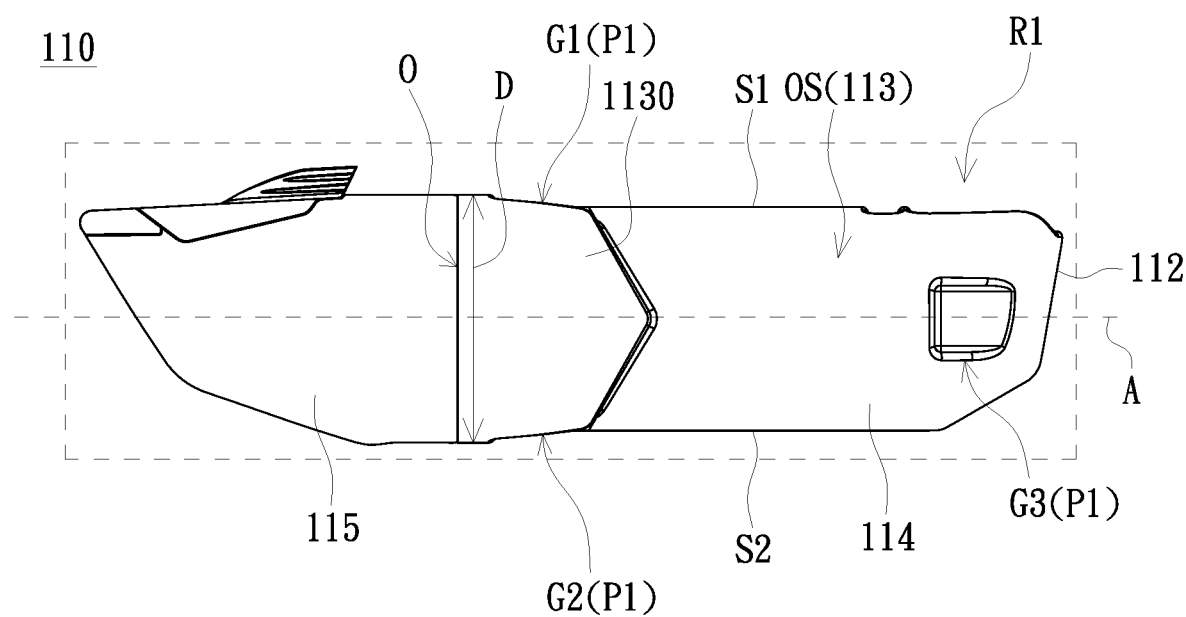
FIG. 5 is a schematic side view of the bottle in FIG. 1.
Figure 5:
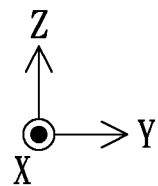
Figure 6:
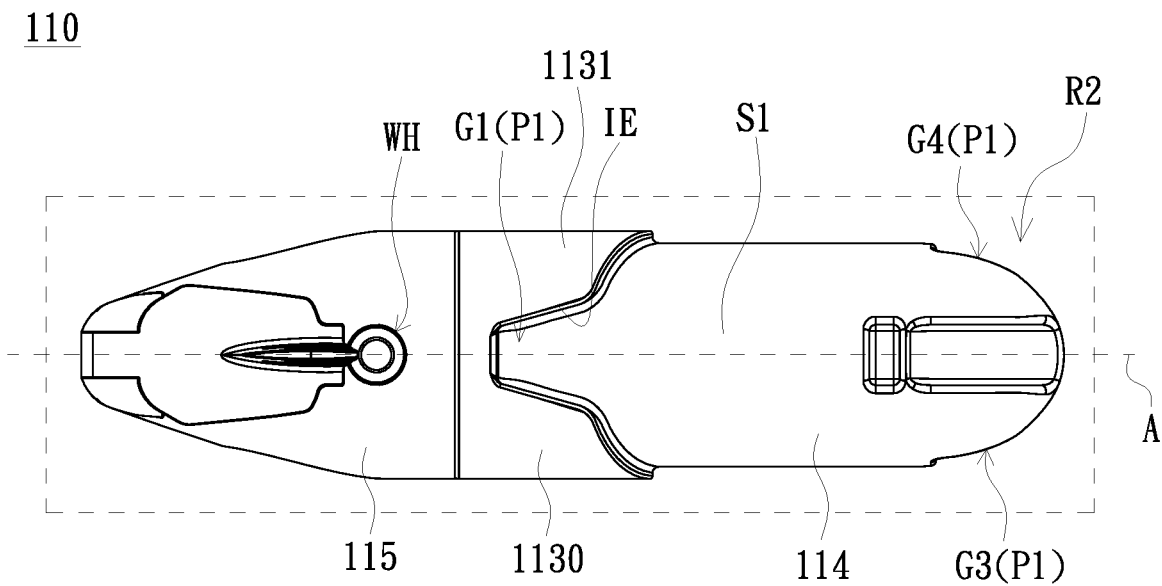
FIG. 6 is a schematic plan view of the bottle in FIG. 5.
Figure 6:
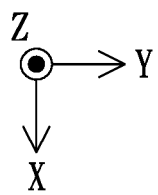
Figure 7:
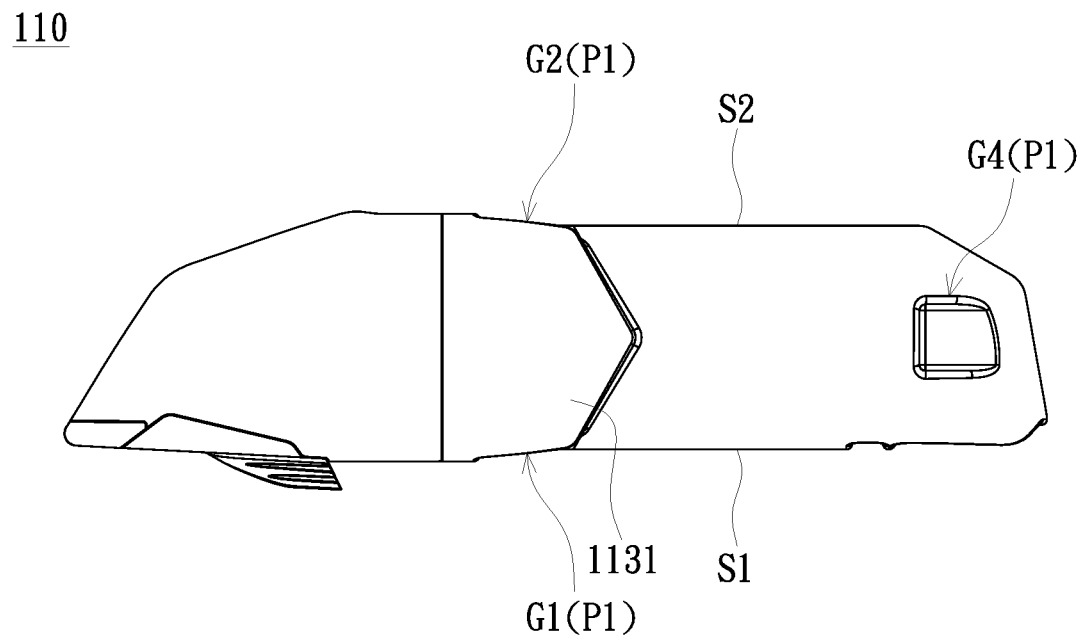
FIG. 7 is a schematic side view of the bottle in FIG. 5 viewed from another angle.
Figure 7:
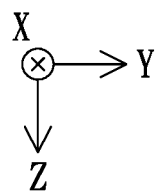
Figure 8:
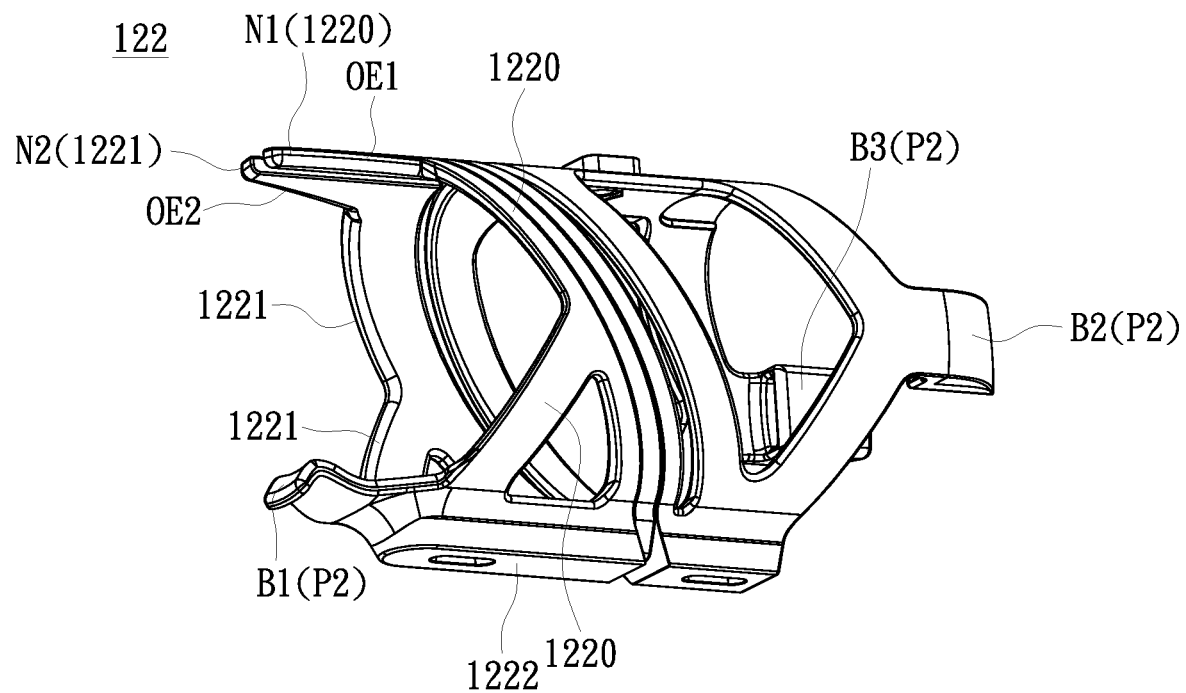
FIG. 8 is a schematic view of the bottle holder in FIG. 1.
Figure 9:
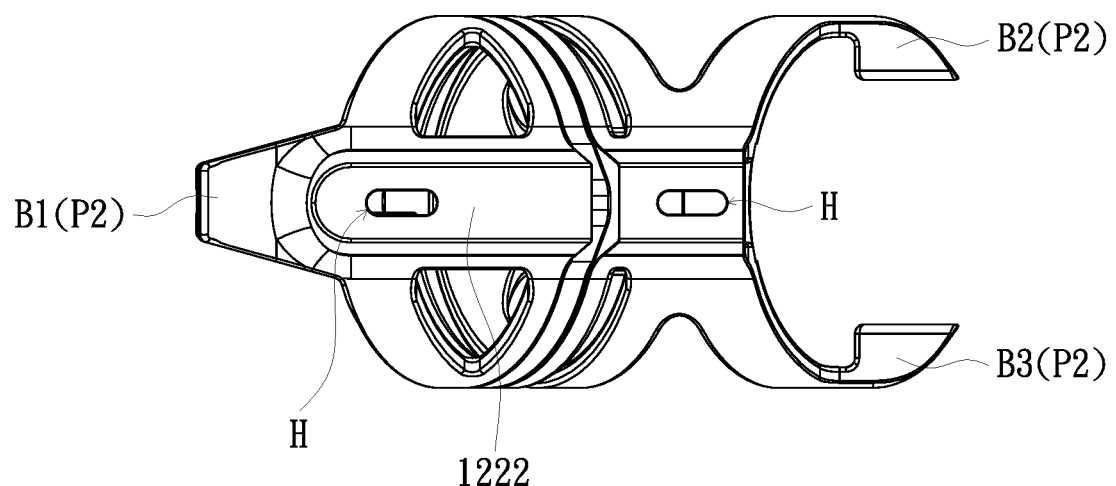
FIG. 9 is a schematic bottom view of the bottle holder of FIG. 8.
Figure 10:
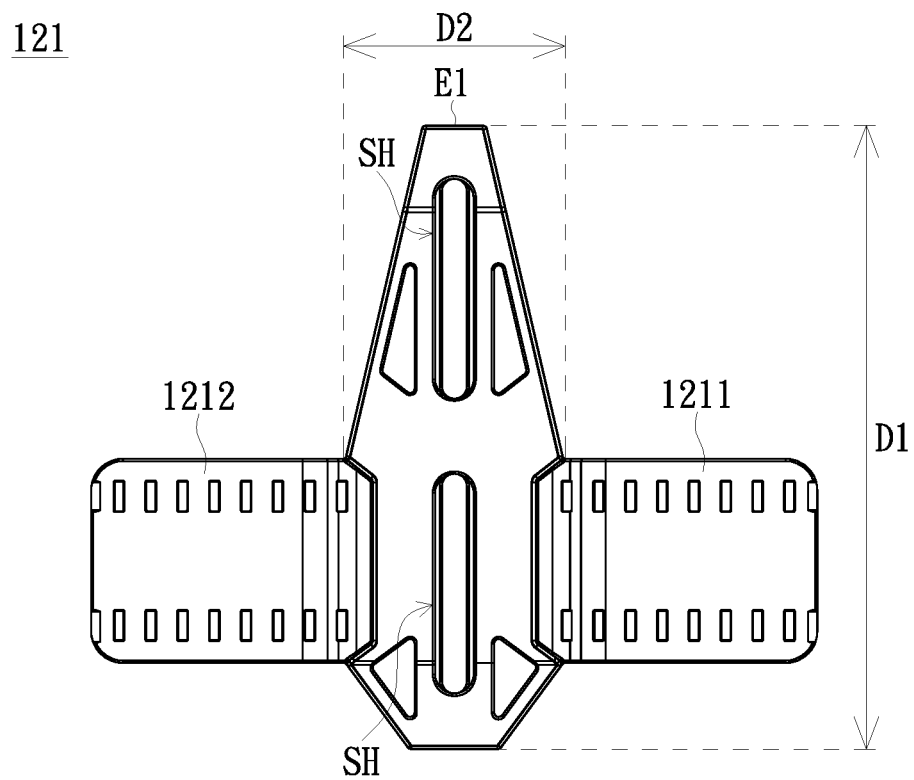
FIG. 10 is a schematic top view of the base in FIG. 1.
Figure 10:
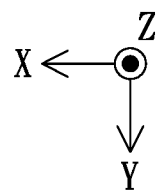
Figure 11:
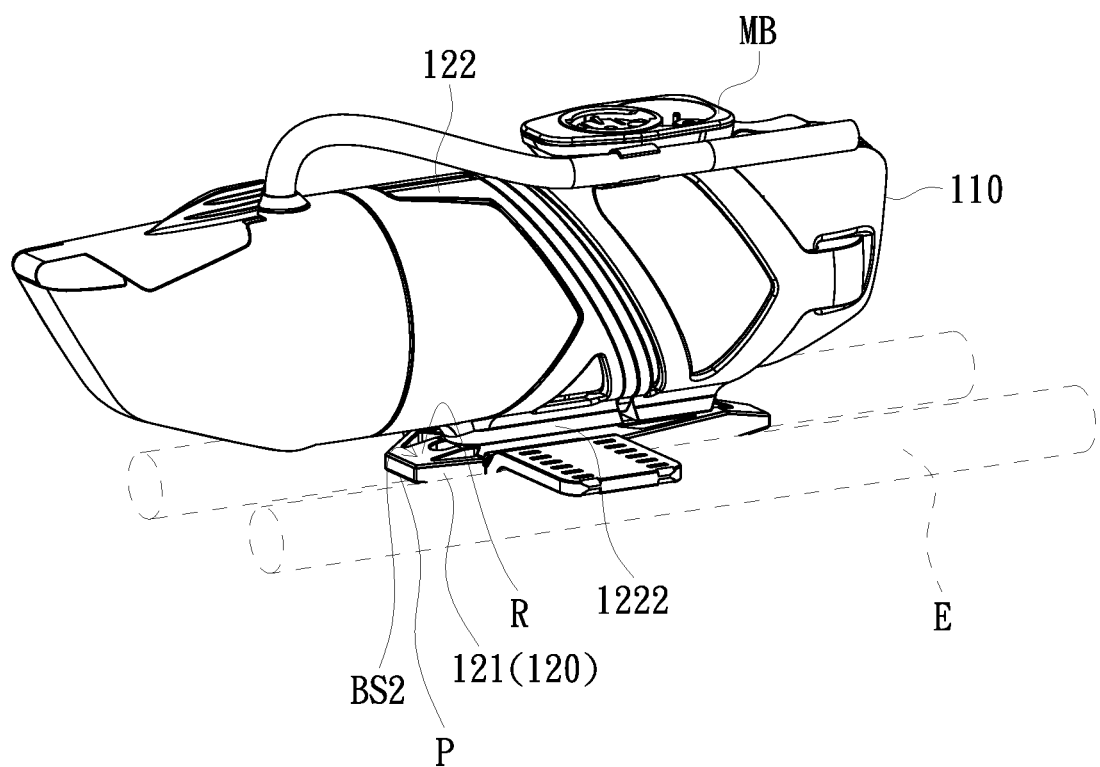
FIG. 11 is a schematic view of the base in FIG. 1 of another installation way.
Figure 12:
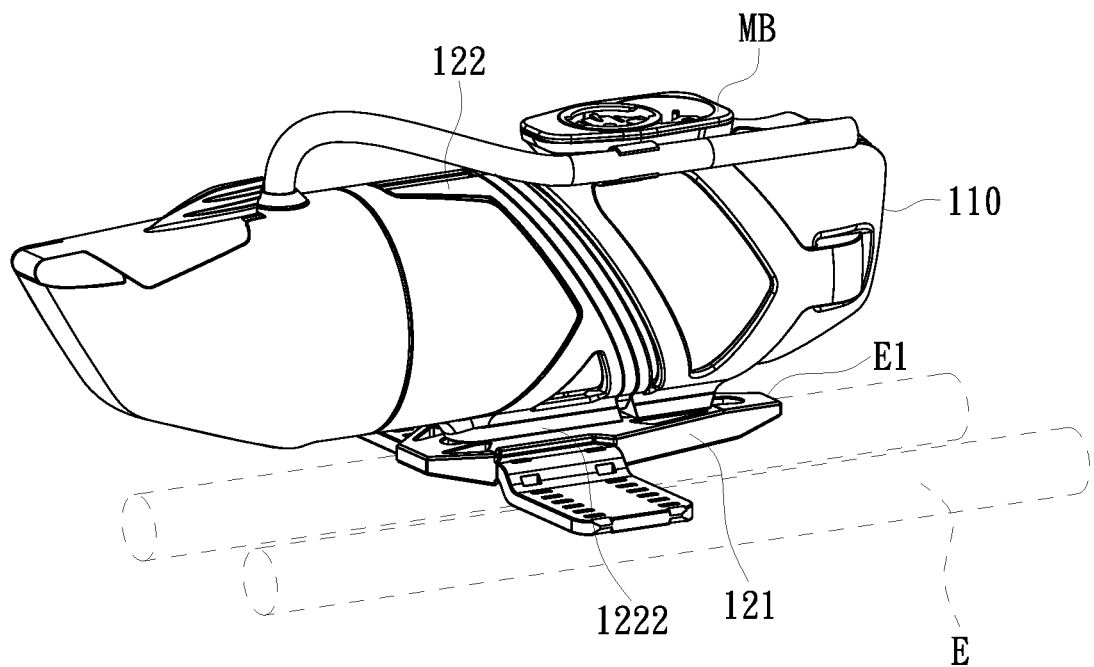
FIG. 12 is a schematic view of the base in FIG. 1 of another installation way.

FIG. 1 is a schematic view of a bottle of a bottle assembly in a first installation mode according to an embodiment of the present invention. FIG. 2 is a schematic view of the bottle assembly of FIG. 1 viewed from another angle. FIG. 3 is a schematic view of the bottle of the bottle assembly of FIG. 1 in a second installation mode. FIG. 4 is a schematic view of the bottle assembly of FIG. 3 viewed from another angle. FIG. 5 is a schematic side view of the bottle in FIG. 1. FIG. 6 is a schematic plan view of the bottle in FIG. 5. FIG. 7 is a schematic side view of the bottle in FIG. 5 viewed from another angle. FIG. 8 is a schematic view of the bottle holder in FIG. 1. FIG. 9 is a schematic bottom view of the bottle holder of FIG. 8. FIG. 10 is a schematic top view of the base in FIG. 1. FIG. 11 is a schematic view of the base in FIG. 1 of another installation way. FIG. 12 is a schematic view of the base in FIG. 1 of another installation way.

Please refer to FIGS. 1 and 3 first. The bottle assembly 100 includes a bottle 110 and a supporting device 120. The supporting device 120 of this embodiment can be installed on an auxiliary handle E of a bicycle, but the present invention does not limit the installation position of the supporting device 120. The bottle 110 of this embodiment can be, for example, inserted and fixed in the supporting device 120. The bottle 110 has a top 111, a bottom 112 and a bottle wall 113 (all labeled in FIG. 1). The top 111 and the bottom 112 are opposite to each other, and the bottle wall 113 extends from the top 111 to the bottom 112. An outer surface OS of the bottle wall 113 has a plurality of first positioning portions P1, and this embodiment takes four first positioning portions P1 as an example (also shown in FIGS. 5 to 7). The bottle wall 113 has a first side S1 and a second side S2 opposite to each other. The supporting device 120 includes a base 121 and a bottle holder 122. The bottle holder 122 is connected to the base 121 and is adapted to accommodate the bottle 110. The bottle holder 122 has a plurality of second positioning portions P2 corresponding to the first positioning portions P1, and this embodiment takes three second positioning portions P2 as an example (also shown in FIGS. 8 to 9).

The bottle 110 has a first installation mode (FIG. 1) and a second installation mode (FIG. 3). As shown in FIG. 1, the supporting device 120 in this embodiment can be arranged above the auxiliary handle E, so that the bottle 110 can be installed in the first installation mode. In the first installation mode, the second side S2 of the bottle 110 faces the base 121, and the second positioning portions P2 and at least part of the first positioning portions P1 are fixed to each other. On the other hand, as shown in FIG. 3, the supporting device 120 can be arranged under the auxiliary handle E, so that the bottle 110 can be installed in the second installation mode. In the second installation mode, the first side S1 of the bottle 110 faces the base 121, and the second positioning portions P2 and at least part of the first positioning portions P1 are fixed to each other. In other words, the base 121 is adapted to be close to the second side S2 and away from the first side S1 in the first installation mode, and adapted to be close to the first side S1 and away from the second side S2 in the second installation mode.

Please refer to FIGS. 1, 3 and 6 together. The bottle 110 may further include a bottle body 114 and a bottle cap 115 (both labeled in FIG. 6). The bottle cap 115 is located at the top 111 and may have a part of the bottle wall 113, and the bottle body 114 is disposed between the top 111 and the bottom 112 and may have another part of the bottle wall 113. The first positioning portions P1 are located on the bottle body 114. The bottle cap 115 is, for example, provided with a water delivery hole WH on the first side S1. The bottle 110 further includes, for example, a water tube WT, and the water tube WT is connected to the water delivery hole WH. Specifically, the water delivery hole WH faces away from the base 121 when in the first installation mode as shown in FIG. 1; and the water delivery hole WH faces the base 121 when in the second installation mode as shown in FIG. 3. In this way, the water delivery hole WH always faces the upper side of the auxiliary handle E when the bottle 110 is in the first installation mode or in the second installation mode, thereby preventing water leakage of the bottle 110 in the first installation mode or in the second installation mode. Incidentally, please referring to FIG. 5, the bottle body 114 may have a bottle opening O opposite to the bottom 112. The outer diameter D of the bottle body 114 gradually decreases from the bottle opening O toward the bottom 112, so that the bottle body 114 can be easily inserted into the bottle holder 122.

The detailed structures of the first positioning portion P1 and the second positioning portion P2 will be described below. Please refer to FIGS. 5, 6 and 7 together. The bottle wall 113 may have a central axis A passing through the top 111 and the bottom 112, and the central axis A of this embodiment is, for example, parallel to the direction Y. The first positioning portion P1 includes first grooves G1 and G2 close to the top 111, and the first grooves G1 and G2 are symmetrically arranged with respect to the central axis A. In addition, the top 111 of the bottle 110 is located at the bottle cap 115, and the bottom 112 is located at the bottom body 114. The first positioning portion P1 can be located on the bottle body 114, so that the bottle body 114 can be always fixed in the bottle holder 122 when the bottle 110 is in the first installation mode or in the second installation mode. It should be noted that FIG. 6 only shows the schematic top view of the first groove G1, and the detailed structure of the first groove G2 is similar to that of the first groove G1.

Please refer to FIGS. 8 and 9. One of the second positioning portions P2 is the first buckle B1. Please refer to FIGS. 1 and 8 together. The first buckle B1 (shown in FIG. 8) is buckled to one of the first grooves G1 and G2 when the bottle 110 is in the first installation mode, wherein FIG. 1 takes the first groove G2 as an example. On the contrary, the first buckle B1 is buckled to the other of the first grooves G1 and G2 when the bottle 110 is in the second installation mode as shown in FIG. 3, wherein FIG. 3 takes the first groove G1 as an example. It can be understood that the detailed structures of the first buckle B1 and the first grooves G1, G2 can be modified according to actual needs and are not limited to those shown in the figures.

Please refer to FIGS. 5, 6 and 7 again. The first positioning portion P1 further includes, for example, second grooves G3 and G4 close to the bottom 112, and the second grooves G3 and G4 are symmetrically arranged with respect to the central axis A. On the other hand, please referring to FIGS. 8 and 9 again, the second positioning portions P2 may further include second buckles B2 and B3 corresponding to the second grooves G3 and G4. In detail, as shown in FIG. 2, the second buckle B2 is buckled to the second groove G3 and the second buckle B3 is buckled to the second groove G4 when the bottle 110 is in the first installation mode. On the contrary, as shown in FIG. 4, the second buckle B2 is buckled to the second groove G4 and the second buckle B3 is buckled to the second groove G3 when the bottle 110 is in the second installation mode. In addition, the first grooves G1 and G2 of this embodiment may be located on the first side S1 and the second side S2, respectively. For example, the first groove G1 may be located on the first side S1, and the first groove G2 may be located on the second side S2. The second grooves G3 and G4 may be respectively located on the opposite sides of the bottle wall 113 between the first side S1 and the second side S2. In this way, the positions of the first grooves G1 and G2 are staggered with the positions of the second grooves G3 and G4, so as to further prevent the bottle 110 from rotating in the bottle holder 122 and therefore the bottle 110 can be more firmly fixed in the bottle holder 122. Incidentally, the shapes of the second buckles B2, B3 and the first grooves G1, G2 can be modified according to the actual needs and are not limited to those shown in the figures.

Please refer to FIGS. 5, 6 and 7 again. The outer surface OS (labeled in FIG. 5) of the bottle wall 113 can further be provided with positioning convex portions 1130 and 1131 close to the top 111, and the positioning convex portions 1130 and 1131 are symmetrically arranged with respect to the first reference plane R1 (shown in FIG. 5) passing through the first side S1, the second side S2 and the central axis A. The first reference plane R1 in this embodiment may be parallel to the Y-Z plane. Please refer to FIG. 8 again, the outline of the bottle holder 122 is formed with abutting portions 1220 and 1221, and the shape of the abutting portions 1220 and 1221 and the shape of the positioning convex portions 1130 and 1131 are matched with each other. For example, the shape of the positioning convex portions 1130 and 1131 is complementary to the shape of the abutting portions 1220 and 1221, but the present invention is not limited thereto. In the embodiment as shown in FIGS. 1 and 3, the positioning convex portions 1130 and 1131 are adapted to abut against the abutting portions 1220 and 1221. Furthermore, when the bottle 110 is in the first installation mode as shown in FIG. 1, the positioning convex portion 1130 abuts against the abutting portion 1220 and the positioning convex portion 1131 (shown in FIGS. 6 and 7) abuts against the abutting portion 1221 (shown in FIG. 8). On the contrary, when the bottle 110 is in the second installation mode as shown in FIG. 3, the positioning convex portion 1130 abuts against the abutting portion 1221 and the positioning convex portion 1131 (shown in FIGS. 6 and 7) abuts against the abutting portion 1220 (shown in FIG. 8). In this way, the bottle 110 can be further prevented from rotating in the bottle holder 122, and therefore the firmness of the bottle 110 in the bottle holder 122 in the first installation mode and the second installation mode can be further improved. In addition, please refer to FIGS. 5, 6 and 7 again. The shape of each positioning convex portion 1130, 1131 is symmetrical with respect to the second reference plane R2 (shown in FIG. 6) perpendicular to the first reference plane R1, and the second reference plane R2 of this embodiment can be parallel to the X-Y plane. The shapes of the abutting portions 1220 and 1221 are matched with the positioning convex portions 1130 and 1131, so that the positioning convex portions 1130 and 1131 (positioning convex portion 1131 is shown in FIGS. 6 and 7) of the bottle 110 both can extend into and be fixed in the abutting portions 1220 and 1221 in the first installation mode (FIG. 1) and in the second installation mode (FIG. 3). Incidentally, the positioning convex portions 1130 and 1131 of this embodiment can be located between the first grooves G1 and G2, but the detailed features such as the position and shape of the positioning convex portions 1130 and 1131 shown in the figure are only examples and not intended to limit the invention.

Please refer to FIG. 8 again. The abutting portion 1220 is formed with an engaging portion N1, and the abutting portion 1221 is formed with an engaging portion N2. The positions of the engaging portions N1 and N2 may be opposite to the first buckle B1. In detail, when the bottle 110 is in the first installation mode as shown in FIG. 1, the engaging portions N1 and N2 (engaging portion N2 is shown in FIG. 8) are fixed to the first groove G1, and the first buckle B1 (shown in FIG. 8) is fixed to the first groove G2. Furthermore, when the bottle 110 is in the first installation mode, the outer edge OE1 of the engaging portion N1 and the outer edge OE2 (shown in FIG. 8) of the engaging portion N2 are opposite to the inner edge IE (shown in FIG. 6) of the first groove G1, and parts of the outer edges OE1 and OE2 close to the bottle cap 115 can abut against the inner edge IE of the first groove G1. Please refer to FIGS. 3, 5 and 8. On the other hand, when the bottle 110 is in the second installation mode, the engaging portions N1 and N2 are fixed to the first groove G2 (shown in FIG. 5), and the first buckle B1 is fixed to the first groove G1. Similarly, when the bottle 110 is in the second installation mode, the outer edges OE1 and OE2 are opposite to the inner edge of the first groove G2, and parts of the outer edges OE1 and OE2 close to the bottle cap 115 can abut against the inner edge of the first groove G2.

In the bottle assembly 100 of this embodiment, the second side S2 of the bottle 110 faces the base 121 and is fixed to the bottle holder 122 when the bottle 110 is in the first installation mode, and the first side S1 of the bottle 110 faces the base 121 and is fixed to the bottle holder 122 when the bottle 110 is in the second installation mode. Based on the above, compared with the prior art, the bottle 110 of the present embodiment can be fixed to the supporting device 120 in at least two different postures, so the bottle assembly 100 of the present embodiment has the advantage of various installation ways. Similarly, the supporting device 120 of this embodiment can provide various ways for the bottle 110 to be inserted into and fix the bottle 110.

Please refer to FIGS. 2, 4 and 10 together for the detailed features of the base 121. The base 121 may have a supporting portion 1210 and connecting portions 1211 and 1212. The supporting portion 1210 can be provided for the installation of the supporting device 120, and the connecting portions 1211 and 1212 can be connected to the auxiliary handle E. The connecting portions 1211 and 1212 are connected to the opposite sides of the supporting portion 1210, so that the base 121 has a convex side P and a concave side R (both shown in FIGS. 2 and 4) opposite to each other. The supporting portion 1210 has a supporting surface BS1 located on the convex side P and a supporting surface BS2 located on the concave side R. The bottle holder 122 is adapted to be connected to any one of the supporting surfaces BS1 and BS2, so as to adjust the distance between the bottle holder 122 and the auxiliary handle E. Therefore, the rider can adjust the installation ways according to factors such as the rider's body shape, the habit of using the bottle 110, etc. For example, in the installation ways shown in FIGS. 2 and 4, the bottle holder 122 is arranged on the supporting surface BS1 of the base 121 on the convex side P, so that the bottle holder 122 is farther away from the auxiliary handle E, thereby increasing the space between the bottle holder 122 and the auxiliary handle E. In addition, please refer to FIG. 11. The bottle holder 122 can also be arranged on the supporting surface BS2 of the base 121 on the concave side R, so that the bottle holder 122 is closer to the auxiliary handle E, thereby reducing the space between the bottle holder 122 and the auxiliary handle E.

Please refer to FIGS. 9 and 10 again. The supporting portion 1210 may further have an elongated hole SH (shown in FIG. 10) penetrating the supporting surfaces BS1 and BS2. The bottle holder 122 has a fixing portion 1222 (shown in FIG. 9) adapted to be connected to the supporting portion 1210, and the fixing portion 1222 has an opening H corresponding to the elongated hole SH. In this way, the bottle holder 122 can move relative to the supporting portion 1210 along the elongated hole SH, so as to adjust the position of the bottle holder 122 fixed to the supporting portion 1210. The fixing portion 1222 of this embodiment can be fixed to the supporting portion 1210 by screws, but the present invention is not limited thereto. It can be understood that the numbers, specific shapes and positions of the openings H and the elongated hole SH shown in this embodiment are only examples, and the present invention is not limited thereto.

Please refer to FIG. 10 again. The width D1 of the supporting portion 1210 in the direction Y may be greater than the width D2 of the supporting portion 1210 in the direction X. Therefore, as shown in FIG. 1, when the head end E1 of the supporting portion 1210 faces the direction opposite to the direction Y, the bottle holder 122 has a larger moving range in the direction opposite to the direction Y. On the contrary, as shown in FIG. 12, when the head end E1 of the supporting portion 1210 faces the direction Y, the bottle holder 122 has a larger moving range in the direction Y, so that it is easier to adjust the position of the bottle holder 122.

Incidentally, please refer to FIGS. 1 and 3 again. The supporting device 120 may further include a stopwatch fixing portion MB. The stopwatch fixing portion MB is detachably connected to the bottle holder 122 or the base 121. For example, the stopwatch fixing portion MB can be arranged on the bottle holder 122 and close to the first side S1 when the bottle 110 is in the first installation mode, so as to facilitate the rider to watch the stopwatch. Similarly, the stopwatch fixing portion MB can be arranged on the base 121 and close to the first side S1 when the bottle 110 is in the second installation mode, but the present invention is not limited thereto.

In summary, in the bottle assembly of the present invention, the second side of the bottle faces the base and is fixed to the bottle holder when the bottle is in the first installation mode, and the first side of the bottle faces the base and is fixed to the bottle holder when the bottle is in the second installation mode. Based on the above, the bottle of the present invention can be fixed to the supporting device in at least two different postures, and therefore the bottle assembly of the present invention has the advantage of various installation ways. Similarly, the supporting device of the present invention can provide a variety of ways for the bottle to be inserted and fixed.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A bottle assembly, comprising:
   a bottle, having a top, a bottom and a bottle wall, wherein the top and the bottom are opposite to each other, the bottle wall extends from the top to the bottom, an outer surface of the bottle wall has a plurality of first positioning portions, and the bottle wall has a first side and a second side opposite to each other; and
   a supporting device, comprising a base and a bottle holder, wherein the bottle holder is connected to the base and adapted to accommodate the bottle, and the bottle holder has a plurality of second positioning portions corresponding to the plurality of first positioning portions,
   wherein the bottle has a first installation mode and a second installation mode, wherein when the bottle is in the first installation mode, the second side faces the base, and the plurality of second positioning portions and at least part of the plurality of first positioning portions are fixed to each other, wherein when the bottle is in the second installation mode, the first side faces the base, and the plurality of second positioning portions and at least part of the plurality of first positioning portions are fixed to each other;
   wherein the bottle wall has a central axis passing through the top and the bottom, and the bottle is changed between the first installation mode and the second installation mode without rotating respect to the central axis;
   wherein the bottle further comprises a bottle body and a bottle cap, the bottle cap is located at the top and has a part of the bottle wall, the bottle body is arranged between the top and the bottom and has another part of the bottle wall, the plurality of first positioning portions is located on the bottle body, and the bottle cap is provided with a water delivery hole on the first side.

2. The bottle assembly according to claim 1, wherein the plurality of first positioning portions comprises two first grooves close to the top, the two first grooves are symmetrically arranged with respect to the central axis, one of the plurality of second positioning portions is a first buckle, wherein when the bottle is in the first installation mode, the first buckle is buckled to one of the two first grooves, wherein when the bottle is in the second installation mode, the first buckle is buckled to the other of the two first grooves.

3. The bottle assembly according to claim 2, wherein the plurality of first positioning portions further comprises two second grooves close to the bottom, the two second grooves are symmetrically arranged with respect to the central axis, and the plurality of second positioning portions further comprises two second buckles corresponding to the two second grooves.

4. The bottle assembly according to claim 3, wherein the two first grooves are respectively located on the first side and the second side, and the two second grooves are respectively located on opposite sides of the bottle wall between the first side and the second side.

5. The bottle assembly according to claim 1, wherein the outer surface of the bottle wall is further provided with two positioning convex portions close to the top, the two positioning convex portions are symmetrically arranged with respect to a first reference plane passing through the first side, the second side and the central axis, an outline of the bottle holder is formed with two abutting portions, shapes of the two abutting portions match shapes of the two positioning convex portions, and the two positioning convex portions are adapted to abut against the two abutting portions.

6. The bottle assembly according to claim 5, wherein the shapes of the two positioning convex portions are symmetrical with respect to a second reference plane perpendicular to the first reference plane.

7. The bottle assembly according to claim 1, wherein the base has a supporting portion and two connecting portions, the two connecting portions are connected to opposite sides of the supporting portion so that the base has a convex side and a concave side opposite to each other, the supporting portion has two supporting surfaces respectively located on the convex side and the concave side, and the bottle holder is adapted to be connected to any one of the two supporting surfaces.

8. The bottle assembly according to claim 7, wherein the supporting portion further has an elongated hole penetrating the two supporting surfaces, the bottle holder has a fixing portion adapted to be connected to the supporting portion, and the fixing portion has an opening corresponding to the elongated hole.

9. The bottle assembly according to claim 1, wherein the bottle body has a bottle opening opposite to the bottom, and an outer diameter of the bottle body gradually decreases from the bottle opening toward the bottom.

10. The bottle assembly according to claim 1, wherein the supporting device further comprises a stopwatch fixing portion, and the stopwatch fixing portion is detachably connected to the bottle holder or the base.

11. A supporting device adapted to accommodate a bottle, the bottle having a top, a bottom and a bottle wall, the top and the bottom being opposite to each other, the bottle wall extending from the top to the bottom, an outer surface of the bottle wall having a plurality of first positioning portions, the bottle wall having a first side and a second side opposite to each other, the bottle having a first installation mode and a second installation mode, and the supporting device comprising:
   a base; and
   a bottle holder, connected to the base and adapted to accommodate the bottle, wherein the bottle holder has a plurality of second positioning portions corresponding to the plurality of first positioning portions,
   wherein when the bottle is in the first installation mode, the base is adapted to be close to the second side and far away from the first side, and the plurality of second positioning portions is adapted to be fixed to at least part of the plurality of first positioning portions, wherein when the bottle is in the second installation mode, the base is adapted to be close to the first side and far away from the second side, and the plurality of second positioning portions is adapted to be fixed to at least part of the plurality of first positioning portions;
   wherein the bottle wall has a central axis passing through the top and the bottom, and the bottle is changed between the first installation mode and the second installation mode without rotating respect to the central axis;
   wherein the bottle further comprises a bottle body and a bottle cap, the bottle cap is located at the top and has a part of the bottle wall, the bottle body is arranged between the top and the bottom and has another part of the bottle wall, the plurality of first positioning portions is located on the bottle body, and the bottle cap is provided with a water delivery hole on the first side.

12. A bottle adapted to be placed in a supporting device, the supporting device comprising a base and a bottle holder, the bottle holder being connected to the base and adapted to accommodate the bottle, the bottle holder having a plurality of second positioning portions, and the bottle comprising:
- a top, a bottom and a bottle wall, wherein the top and the bottom are opposite to each other, the bottle wall extends from the top to the bottom, an outer surface of the bottle wall has a plurality of first positioning portions, and the bottle wall has a first side and a second side opposite to each other,
- wherein the bottle has a first installation mode and a second installation mode, wherein when the bottle is in the first installation mode, the second side is adapted to face the base, and at least part of the plurality of first positioning portions is adapted to be fixed to the plurality of second positioning portions, wherein when the bottle is in the second installation mode, the first side is adapted to face the base, and at least part of the plurality of first positioning portions is fixed to the plurality of second positioning portions;
- wherein the bottle wall has a central axis passing through the top and the bottom, and the bottle is changed between the first installation mode and the second installation mode without rotating respect to the central axis;
- wherein the bottle further comprises a bottle body and a bottle cap, the bottle cap is located at the top and has a part of the bottle wall, the bottle body is arranged between the top and the bottom and has another part of the bottle wall, the plurality of first positioning portions is located on the bottle body, and the bottle cap is provided with a water delivery hole on the first side.

* * * * *